(12) United States Patent
Soldevila et al.

(10) Patent No.: US 9,792,492 B2
(45) Date of Patent: Oct. 17, 2017

(54) EXTRACTING GRADIENT FEATURES FROM NEURAL NETWORKS

(71) Applicant: Xerox Corporation, Norwalk, CT (US)

(72) Inventors: Albert Gordo Soldevila, Grenoble (FR); Adrien Gaidon, Grenoble (FR); Florent C. Perronnin, Domène (FR)

(73) Assignee: XEROX CORPORATION, Norwalk, CT (US)

( * ) Notice: Subject to any disclaimer, the term of this patent is extended or adjusted under 35 U.S.C. 154(b) by 202 days.

(21) Appl. No.: 14/793,434

(22) Filed: Jul. 7, 2015

(65) Prior Publication Data
US 2017/0011280 A1   Jan. 12, 2017

(51) Int. Cl.
*G06K 9/62* (2006.01)
*G06K 9/00* (2006.01)

(52) U.S. Cl.
CPC .................. *G06K 9/00362* (2013.01)

(58) Field of Classification Search
None
See application file for complete search history.

(56) References Cited

U.S. PATENT DOCUMENTS

| | | | | |
|---|---|---|---|---|
| 8,774,498 B2 * | 7/2014 | de Campos | ........ | G06K 9/00597 382/115 |
| 2015/0265347 A1 * | 9/2015 | Yates | ................ | A61B 18/1206 606/50 |
| 2016/0132718 A1 * | 5/2016 | Park | .................... | G06K 9/3275 382/118 |

OTHER PUBLICATIONS

LeCun, Yann, Yoshua Bengio, and Geoffrey Hinton. "Deep learning." Nature 521.7553 (May 28, 2015): 436-444.*
Vedaldi, Andrea, and Karel Lenc. "MatConvNet-Convolutional Neural Networks for MATLAB." arXiv preprint arXiv:1412.4564 (2014).*
U.S. Appl. No. 14/691,021, filed Apr. 20, 2015, Florent C. Perronnin, et al.
U.S. Appl. No. 14/793,374, filed Jul. 7, 2015, Albert Gordo Soldevila.
Babenko, et al., "Neural codes for image retrieval," ECCV, pp. 584-599 (2014).
Bergamo, et al., "PiCoDeS: Learning a compact code for novel-category recognition," NIPS, pp. 2088-2096 (2011).
Bottou, "Online algorithms and stochastic approximations," in Online Learning and Neural Networks, D. Saad, editor, pp. 9-42, Cambridge University Press, Cambridge, UK (1998).
Chatfield, et al., "The devil is in the details: an evaluation of recent feature encoding methods," BMVC, pp. 1-12 (2011).
Chatfield, et al., "Return of the devil in the details: delving deep into convolutional nets," BMVC, pp. 1-12 (2014).
Csurka, et al., "Visual categorization with bags of keypoints," ECCV SLCV workshop, pp. 1-22 (2004).
Deng, et al., "ImageNet: A large-scale hierarchical image database," CVPR, pp. 248-255 (2009).

(Continued)

*Primary Examiner* — Sumati Lefkowitz
*Assistant Examiner* — David Perlman
(74) *Attorney, Agent, or Firm* — Fay Sharpe LLP (57) ABSTRACT

A method for extracting a representation from an image includes inputting an image to a pre-trained neural network. The gradient of a loss function is computed with respect to parameters of the neural network, for the image. A gradient representation is extracted for the image based on the computed gradients, which can be used, for example, for classification or retrieval.

18 Claims, 4 Drawing Sheets

(56) References Cited

OTHER PUBLICATIONS

Donahue, et al., "DeCAF: A deep convolutional activation feature for generic visual recognition," ICML, pp. 647-655 (2014).

Douze, et al., "Combining attributes and fisher vectors for efficient image retrieval," CVPR, pp. 745-752 (2011).

Fine, et al., "A hybrid GMM/SVM approach to speaker identification," IEEE ICASSP, (1), 417-420 (2001).

Girshick, et al., "Rich feature hierarchies for accurate object detection and semantic segmentation," CVPR, pp. 580-587 (2014).

Gong, et al., "Multi-scale orderless pooling of deep convolutional activation features," ECCV, pp. 392-407 (2014).

Gordo, et al., "Leveraging category-level labels for instance-level image retrieval," CVPR, pp. 3045-3052 (2012).

He, et al. "Spatial pyramid pooling in deep convolutional networks for visual recognition," ECCV, Lecture Notes in Computer Science, vol. 8961, pp. 346-361 (2014).

Jaakkola, et al., "Exploiting generative models in discriminative classifiers," NIPS, pp. 487-493 (1998).

Jégou, et al., "Aggregating local descriptors into a compact image representation," CVPR, pp. 3304-3311 (2010).

Krizhevsky, et al., "ImageNet classification with deep convolutional neural networks," NIPS, pp. 1106-1114 (2012).

Lecun, et al., "Handwritten digit recognition with a backpropagation network," NIPS, pp. 396-404 (1989).

Oquab, et al., "Learning and transferring mid-level image representations using convolutional neural networks," CVPR, pp. 1717-1724 (2014).

Peng, et al., Boosting VLAD with supervised dictionary learning and high-order statistics, ECCV, pp. 660-674 (2014).

Peng, et al., "Action recognition with stacked Fisher vectors," ECCV, pp. 581-595 (2014).

Perronnin, et al., "Fisher kernels on visual vocabularies for image categorization," CVPR, pp. 1-8 (2007).

Perronnin, et al., "Improving the fisher kernel for large-scale image classification," ECCV, pp. 143-156 (2010).

Razavian, et al., "CNN features off-the-shelf: An astounding baseline for recognition," CVPR Deep Vision Workshop, pp. 512-519 (2014).

Rumelhart, et al., "Learning representations by back-propagating errors," Nature, vol. 323, pp. 533-536 (1986).

Russakovsky, et al., "Imagenet large scale visual recognition challenge," arXiv, 1409.0575, pp. 1-42 (2014).

Sánchez, et al., "Image classification with the fisher vector: Theory and practice," IJCV, pp. 1-39 (2013).

Sermanet, et al., "OverFeat: Integrated recognition, localization and detection using convolutional networks," ICLR, pp. 1-16 (2014).

Simonyan, et al., "Deep Fisher Networks for Large-scale Image Classification," NIPS, pp. 163-171 (2013).

Simonyan, et al., "Very Deep Convolutional Networks for Large-Scale Image Recognition," arxiv 1409.1556, pp. 1-14 (2014).

Sivic, at al., "Video Google: A text retrieval approach to object matching in videos," ICCV, vol. 2, pp. 1470-1477 (2003).

Smith, et al., "Speech recognition using SVMs," NIPS, pp. 1197-1204 (2001).

Sydorov, et al., "Deep Fisher kernels—End to end learning of the Fisher kernel GMM parameters," CVPR, pp. 1402-1409, 2014.

Szegedy, et al., "Going Deeper with Convolutions," arxiv 1409.4842, pp. 1-12 (2014).

Torresani, et al., "Efficient object category recognition using classemes," ECCV, pp. 776-789, 2010.

Wang, et al., "Learning image similarity from Flickr groups using stochastic intersection kernel machines," ICCV, pp. 428-435 (2009).

Wei, et al., "CNN: single-label to multi-label," arXiv 1406.5726, pp. 1-14 (2014).

Weston, et al., "Large scale image annotation: Learning to rank with joint word-image embeddings," ECML, pp. 21-35 (2010).

Yosinski, et al., "How transferable are features in deep neural networks ?" NIPS, pp. 3320-3328 (2014).

Zeiler, et al., "Visualizing and understanding convolutional networks," ECCV, pp. 818-833 (2014).

Zhou, et al., "Image classification using super-vector coding of local image descriptors," ECCV, pp. 141-154 (2010).

U.S. Appl. No. 14/793,374, filed Jul. 7, 2015, Albert Gordo Soldevila, et al.

\* cited by examiner

EXTRACTING GRADIENT FEATURES FROM NEURAL NETWORKS

BACKGROUND

The exemplary embodiment relates to image representation and finds particular application in connection with a system and method for representing images using weight gradients extracted from a neural network.

Image representations are widely used for image classification (also referred to as image annotation), which involves describing an image with one or multiple predetermined labels, and similarity computation. One form of representation is the bag-of-visual-words (BOV). See, Sivic, at al., "Video Google: A text retrieval approach to object matching in videos," ICCV, vol. 2, pp. 1470-1477, 2003; Csurka, et al., "Visual categorization with bags of keypoints," ECCV SLCV workshop, pp. 1-22, 2004. The BOV entails extracting a set of local descriptors, encoding them using a visual vocabulary (i.e., a codebook of prototypes), and then aggregating the codes into an image-level (or region-level) descriptor. These descriptors can then be fed to classifiers, typically kernel classifiers such as SVMs. Approaches which encode higher order statistics, such as the Fisher Vector (FV) (Perronnin, et al., "Fisher kernels on visual vocabularies for image categorization," CVPR, pp. 1-8, 2007, hereinafter, "Perronnin 2007"; and Perronnin, et al., "Improving the fisher kernel for large-scale image classification," ECCV, pp. 143-156, 2010, hereinafter, "Perronnin 2010"), led to improved results on a number of image classification tasks. See, Sanchez, et al., "Image classification with the fisher vector: Theory and practice," IJCV, 2013.

Convolutional Networks (ConvNets) have also been used for labeling images. See, Krizhevsky, et al., "ImageNet classification with deep convolutional neural networks," NIPS, pp. 1106-1114, 2012, hereinafter, "Krizhevsky 2012"; Zeiler, et al., "Visualizing and understanding convolutional networks," ECCV, pp. 818-833, 2014, hereinafter, "Zeiler 2014"; Sermanet, et al., "OverFeat: Integrated recognition, localization and detection using convolutional networks," ICLR, 2014; Simonyan, et al., "Very Deep Convolutional Networks for Large-Scale Image Recognition," arxiv 1409.1556, 2014, hereinafter, "Simonyan 2014." ConvNets are trained in a supervised fashion on large amounts of labeled data. These models are feed-forward architectures involving multiple computational layers that alternate linear operations, such as convolutions or average-pooling, and non-linear operations, such as max-pooling and sigmoid activations. The end-to-end training of the large number of parameters inside ConvNets from pixel values to the specific end-task is a source of their usefulness.

ConvNets have recently been shown to have good transferability properties when used as "universal" feature extractors. Yosinski, et al., "How transferable are features in deep neural networks?" NIPS, pp. 3320-3328, 2014. If an image is fed to a ConvNet, the output of one of the intermediate layers can be used as a representation of the image. Several methods have been proposed. See, for example, Donahue, et al., "DeCAF: A deep convolutional activation feature for generic visual recognition," ICML, 2014, hereinafter, Donahue 2014; Oquab, et al., "Learning and transferring mid-level image representations using convolutional neural networks," CVPR, pp. 1717-1724, 2014, hereinafter, "Oquab 2014"; Zeiler 2014; Chatfield, et al., "Return of the devil in the details: delving deep into convolutional nets," BMVC, 2014, hereinafter, "Chatfield 2014"; Razavian, et al., "CNN features off-the-shelf: An astounding baseline for recognition," CVPR Deep Vision Workshop, pp. 512-519, 2014, hereinafter, "Razavian 2014"). To use these representations in a classification setting, a linear classifier is typically used.

Hybrid approaches have also been proposed which combine the benefits of deep learning using ConvNets with "shallow" bag-of-patches representations that are based on higher-order statistics, such as the FV. For example, it has been proposed to stack multiple FV layers, each defined as a set of five operations: i) FV encoding, ii) supervised dimensionality reduction, iii) spatial stacking, iv) $l_2$ normalization and v) PCA dimensionality reduction. When combined with the original FV, such networks can lead to significant performance improvements in image classification. See, Simonyan, et al., "Deep Fisher Networks for Large-scale Image Classification," NIPS, 2013). Improvements on the FV framework have been achieved by jointly learning the SVM classifier and the GMM visual vocabulary. Sydorov et al. "Deep Fisher kernels—End to end learning of the Fisher kernel GMM parameters," CVPR, pp. 1402-1409, 2014. The gradients corresponding to the SVM layer are back-propagated to compute the gradients with respect to the GMM parameters. Good results on a number of classification tasks have been obtained by extracting mid-level ConvNet features from large patches, embedding them using VLAD (vector of locally aggregated descriptors) encoding (an extension of the Bag-of-Words representation), and aggregating them at multiple scales. See, Gong, et al., "Multi-scale orderless pooling of deep convolutional activation features," ECCV, pp. 392-407, 2014.

The present system and method provide an efficient way to use ConvNets for generating representations that are particularly useful for computing similarity.

INCORPORATION BY REFERENCE

The following reference, the disclosure of which is incorporated by reference in its entirety by reference, is mentioned:

U.S. application Ser. No. 14/691,021, filed Apr. 20, 2015, entitled FISHER VECTORS MEET NEURAL NETWORKS: A HYBRID VISUAL CLASSIFICATION ARCHITECTURE, by Florent C. Perronnin, et al., describes a an image classification method which includes generating a feature vector representing an input image by extracting local descriptors from patches distributed over the input image and generating a classification value for the input image by applying a neural network (NN) comprising an ordered sequence of layers to the feature vector, where each layer of the ordered sequence of layers is applied by performing operations including a linear vector projection and a non-linear vector transformation.

U.S. application Ser. No. 14/793,374, filed Jul. 7, 2015, entitled LATENT EMBEDDINGS FOR WORD IMAGES AND THEIR SEMANTICS, by Albert Gordo, et al.

BRIEF DESCRIPTION

In accordance with one aspect of the exemplary embodiment, a method for extracting a representation from an image includes inputting an image to a pre-trained neural network. The gradient of a loss function is computed with respect to parameters of the neural network for the image. A gradient representation of the image is extracted, based on the computed gradients.

At least one of the computing and the extracting may be performed with a processor.

In accordance with another aspect of the exemplary embodiment, system for extracting a representation from an image includes memory which stores a pre-trained neural network. A prediction component predicts labels for an input image using a forward pass of the neural network. A gradient computation component computes the gradient of a loss function with respect to parameters of the neural network for the image, based on the predicted labels, in a backward pass of the neural network. A gradient representation generator extracts a gradient representation of the image based on the computed gradients. An output component outputs the gradient representation or information based thereon. A processor in communication with the memory implements the gradient component and prediction component.

In accordance with another aspect of the exemplary embodiment, a method for extracting a representation from an image includes generating a vector of label predictions for an input image in a forward pass of a pre-trained neural network. An error vector is computed, based on differences between the vector of label predictions and a standardized prediction vector. In a backward pass of the neural network, the gradient of a loss function with respect to parameters of the neural network is computed for the image, based on the error vector. A gradient representation of the image is extracted, based on the computed gradients. The gradient representation or information based thereon is output.

At least one of the computing and the extracting may be performed with a processor.

DETAILED DESCRIPTION

Aspects of the exemplary embodiment relate to a system and method for generating image representations and using the image representations to generate information, such as performing classification or image retrieval tasks. The system and method make use of a trained neural network, specifically, a Convolutional Network (ConvNet), generated by end-to-end learning of deep feed-forward models from raw pixel values. The learned neural network is used to derive gradient features, using backpropagation in the neural network. The gradient representation derived from these features corresponds to a structured matrix that facilitates efficient similarity computation.

The Fisher Kernel (FK) involves deriving a kernel from an underlying generative model of the data by taking the gradient of the log-likelihood with respect to the model parameters. In contrast, in the exemplary method described herein, the gradient features are computed based on a cross-entropy criterion measured between predicted class probabilities output by a neural network and a standardized prediction vector (e.g., an equal probability output).

The exemplary gradient representation is in the form of a matrix which allows the trace kernel to be used to measure the similarity between two such representations of different images. The trace kernel can be decomposed into a product of two sub-kernels. The first one is a dot-product between the output of the intermediate layers, as computed during the forward pass, and is equivalent to a standard heuristic kernel. The second sub-kernel is a dot-product between quantities computed during the backward pass.

The neural network-based gradient representation can lead to consistent improvements with respect to alternative methods that represent an image using only quantities computed during the forward pass.

Figure 1:
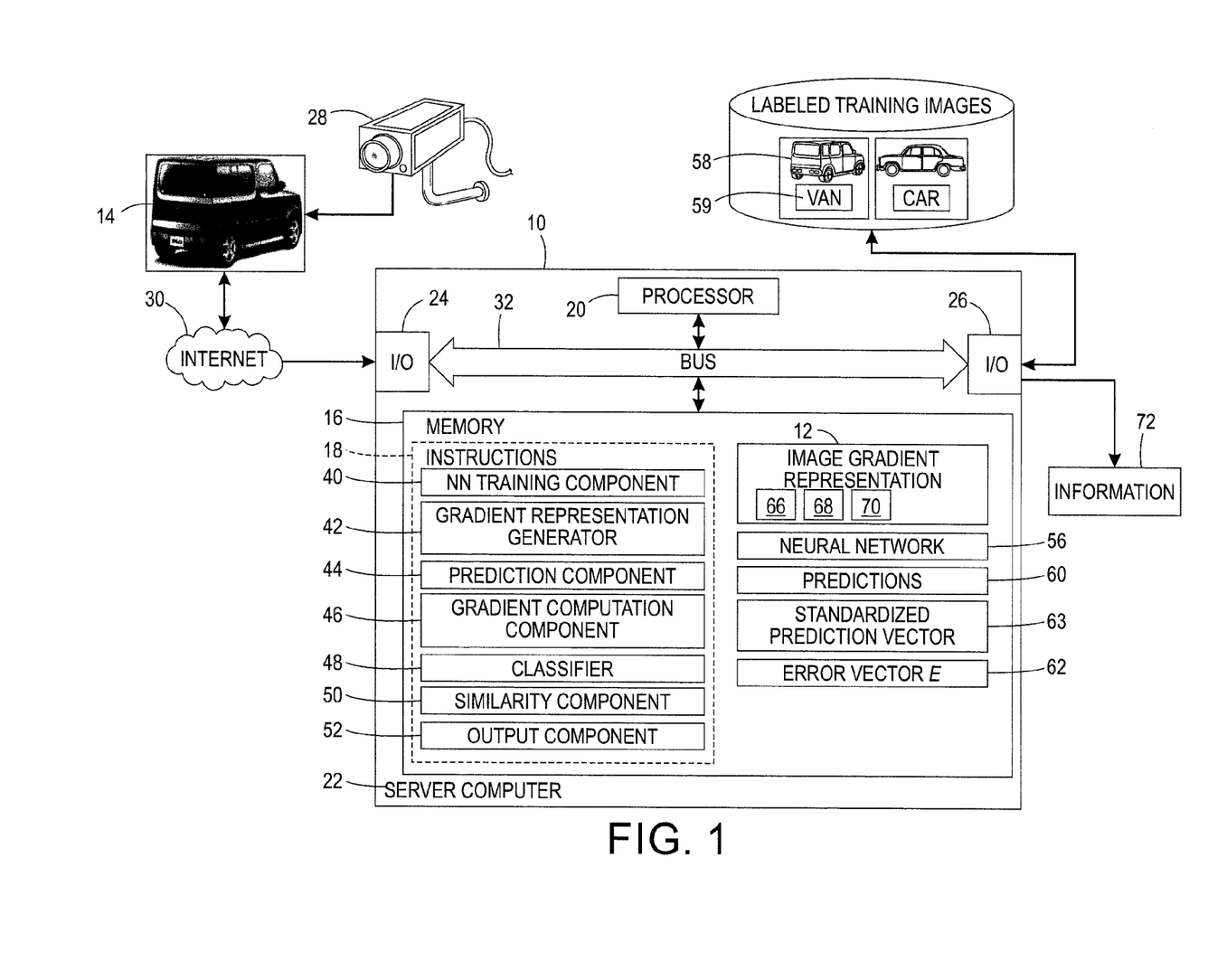
FIG. 1 is a functional block diagram of a system for generating a representation of an image based on weight gradients derived from a convolutional network, in accordance with one aspect of the exemplary embodiment.

With reference to FIG. 1, a computer-implemented system 10 for generating a gradient-based representation 12 of an input object such as an image 14, is shown. The representation 12 is based on weight gradients, as described in detail below. The system includes memory 16 which stores instructions 18 for performing the method illustrated in FIG. 2 and a processor 20 in communication with the memory for executing the instructions. The system 10 may include one or more computing devices 22, such as the illustrated server computer. One or more input/output devices 24, 26 allow the system to communicate with external devices, such as an image capture device 28, or other source of an image, via wired or wireless links 30, such as a LAN or WAN, such as the Internet. The capture device 28 may include a camera, which supplies the image 14, such as a photographic image or frame of a video sequence, to the system 10 for processing. Hardware components 16, 20, 24, 26 of the system communicate via a data/control bus 32.

The illustrated instructions 18 include a neural network (NN) training component 40 and a gradient representation generator 42, a prediction component 44 and a gradient computation component 46. The instructions may further include one or more representation processing components, such as a classifier 48 and/or a similarity computation component 50, and an output component 52.

The NN training component 40 trains a neural network (NN) 56, such as a ConvNet. The neural network includes an ordered sequence of supervised operations (i.e., layers) that are learned on a set of labeled training objects 58, such as images and their true labels 59. The training image labels 59 are drawn from a set of two or more predefined class labels. In an illustrative embodiment, where the input image 14 includes a vehicle, the set of labeled training images 58 comprises a database of images of vehicles each labeled to indicate a vehicle type using a labeling scheme of interest (such as class labels corresponding to "passenger vehicle," "light commercial truck," "semi-trailer truck," "bus," etc., although finer-grained labels or broader class labels are also contemplated). The supervised layers of the neural network 56 are trained on the training images 58 and their labels 59 to generate a prediction 60 (e.g., in the form of class probabilities) for a new, unlabeled image, such as image 14. In some embodiments, the neural network 56 may have already been pre-trained for this task and thus the training component 40 can be omitted.

The representation generator 42 uses the trained neural network 56 to obtain a gradient representation 12 of the input image 14. First, the prediction component 44 generates class predictions 60 for the input image 14, using a forward pass of the NN layers and computes a set of errors (error vector) 62 by computing the differences between the predictions 60 and a standardized set of predictions 63, which can be an equal-valued or otherwise fixed-valued vector. The computed error 62 is used by the gradient computation component 46 to compute a matrix of weight gradients 66, 68, and/or 70 in a backward pass of one or more of the layers of the NN 56. The gradient representation component generates a representation 12 for the image based on the matrix of weight gradients. In some embodiments, the representation is or is based on the matrix of weight gradients itself. In other embodiments, the representation 12 can be a function of the matrix of weight gradients and features previously extracted from the image 14 in the forward pass of the neural network. The image gradient representation 12 may be classified by the previously-learned classifier 48 or used by the similarity computation component 50 to compute a similarity with the representation(s) of another image or images, e.g., for performing image retrieval.

The output component 52 outputs information 72, such as the representation 12 of the image 14, a label (or label probabilities) for the image, output by the classifier 48, and/or one or more similar images identified from a collection of images based on similarity of their respective gradient representations 12, output by the similarity computation component 50, or other information based thereon.

The computer system 10 may include one or more computing devices 22, such as a PC, such as a desktop, a laptop, palmtop computer, portable digital assistant (PDA), server computer, cellular telephone, tablet computer, pager, image capture device, such as camera 28, combination thereof, or other computing device capable of executing instructions for performing the exemplary method.

The memory 16 may represent any type of non-transitory computer readable medium such as random access memory (RAM), read only memory (ROM), magnetic disk or tape, optical disk, flash memory, or holographic memory. In one embodiment, the memory 16 comprises a combination of random access memory and read only memory. In some embodiments, the processor 20 and memory 16 may be combined in a single chip. Memory 16 stores instructions for performing the exemplary method as well as the processed data 60, 62, 66, 68, 70, 12.

The network interface 24, 26 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor device 20 can be variously embodied, such as by a single-core processor, a dual-core processor (or more generally by a multiple-core processor), a digital processor and cooperating math coprocessor, a digital controller, or the like. The digital processor 20, in addition to executing instructions 18 may also control the operation of the computer 22.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
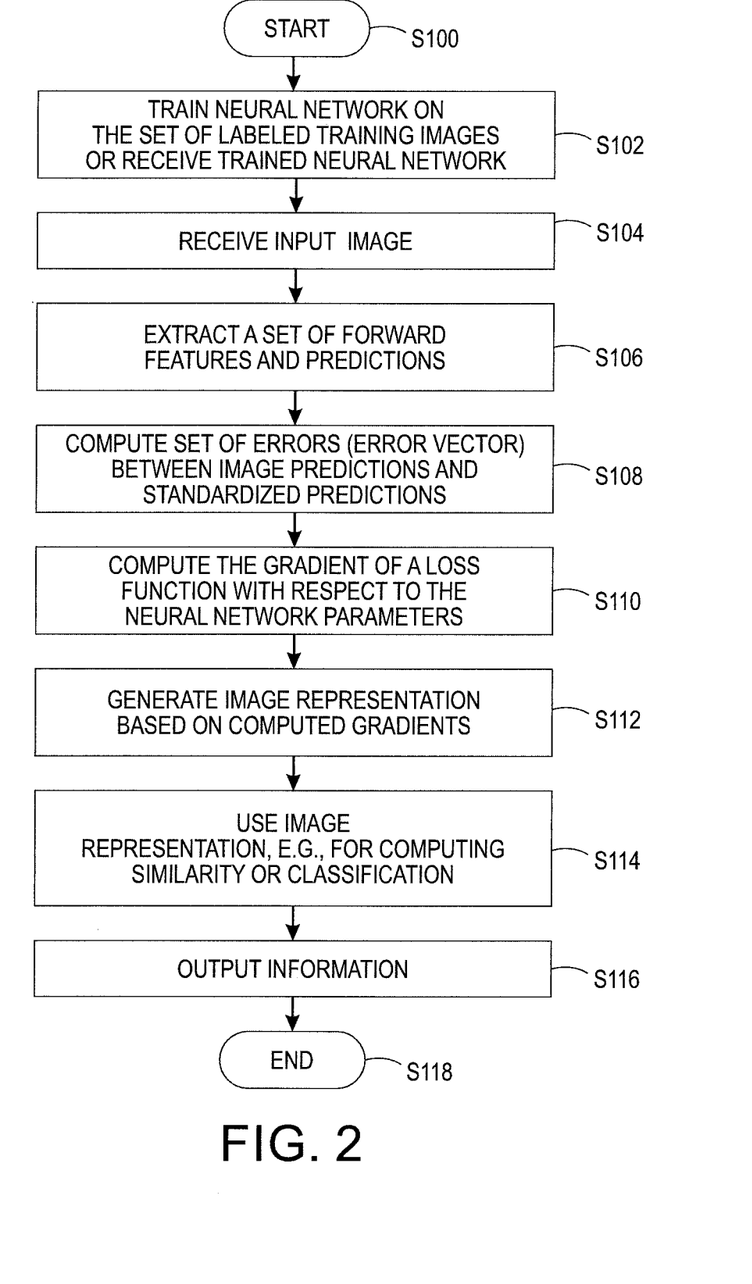
FIG. 2 is a flow chart illustrating a method for generating a representation of an image based on the weight gradients, in accordance with another aspect of the exemplary embodiment.

FIG. 2 illustrates an exemplary method which may be performed with the system of FIG. 1. The method begins at S100.

At S102, the neural network 56 is optionally trained on the set of training images 58 and their labels 59 to predict labels for unlabeled images. The training images may include at least some images of objects that are labeled with labels which are expected to be encountered during the test phase. The training includes learning the weight matrices and tensors of the neural network through backward passes of the neural network. Then, for a new image 14, passed completely through the pre-trained neural network in a forward direction, the neural network outputs label predictions 60 for the set of possible labels. As will be appreciated, even though this is how the neural network is trained, it is not primarily used for label prediction in the exemplary embodiment, but rather to use the predictions 60 to generate a weight gradient-based representation of a new image.

At S104, a new image 14 is received and may be stored in memory 16. The new image 14 may be preprocessed, e.g., resized (reduced pixel resolution) and/or cropped, or the like, before use to the same size and shape as the training images 58.

At S106, the trained neural network 56 is used in a forward pass to generate a set of predictions 60 for the image. This includes generating a set of 3D and 1D tensors (forward features) by projection and rectification.

At S108, a set of errors (error vector) 62 is computed based on the difference between each standardized prediction, obtained from vector 63, and the corresponding image prediction, obtained from the vector 60, for each index (class).

At S110, in a backward pass of the trained neural network 56, the gradient of a loss function with respect to the parameters (weight matrices) of the neural network is computed. In particular, weight gradients 66, 68, and/or 70 (gradients of the errors with respect to weight matrices 100, 102, and/or 104) are computed through backpropagation of the errors 62 computed for the image at S108 (FIG. 2). As the backpropagation proceeds from one layer to the previous one, the weight matrix 100, 102, 104 of one or more of the fully-connected layers is updated accordingly, as a function of the weight gradients computed for the previous layer (or error vector in the case of the last layer 104).

At S112, a weight gradient representation 12 of the image is generated, based on one or more of the computed matrices of weight gradients 66, 68, and 70. For example one or more of these backward features 66, 68, and/or 70 is/are used individually or combined with each other and/or with one or forward features to generate a single representation, e.g., through a tensor product operation.

At S114, the representation 12 may be used for similarity computation (retrieval), by the similarity computation component 50. In this embodiment, a measure of similarity is computed between the gradient representation 12 of the images and gradient representations of other images in an image collection. In another embodiment, the representation 12 is used for classification of the image, with the classifier 48. If the representation 12 is to be used for classification, the classifier 48 may have been trained using gradient representations 12 of training images, such as images 58 or a different set of training images (computed as for the new image 14 at S112) and respective true class labels 59.

At S116, information 72 is output which includes or is based on the gradient representation(s) 12 of one or more images (such as a label or label distribution output by the classifier 48, or a set of similar images retrieved by the similarity component 50.

The method ends at S118.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 22, (for example, an internal hard drive of RAM), or may be separate (for example, an external hard drive operatively connected with the computer 22), or may be separate and accessed via a digital data network such as a local area network (LAN) or the Internet (for example, as a redundant array of inexpensive of independent disks (RAID) or other network server storage that is indirectly accessed by the computer 22, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details of the system and method will now be provided.

Images 58, 14 may be received by the system 10 in any convenient file format, such as JPEG, GIF, JBIG, BMP, TIFF, or the like or other common file format used for images and which may optionally be converted to another suitable format prior to processing. Input query images may be stored in memory during processing. Images 14 can be input from any suitable image source 28, such as a workstation, database, memory storage device, such as a disk, image capture device, such as a camera, or the like. In general, each input digital image includes image data for an array of pixels forming the image.

The images 14, 58 may be individual images, such as photographs, video frames, synthetic images, or the like. In one embodiment each image 14, may be a digital photograph expected to include a region in which an object in one of the classes of interest is expected be visible as a set of pixels of the image. The image data of the image, which is input to the CNN, may include colorant values for each of the pixels in the image, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). The exemplary embodiment may also be used for black and white (monochrome) images or for images which have been converted to monochrome for convenient processing.

Figure 3:
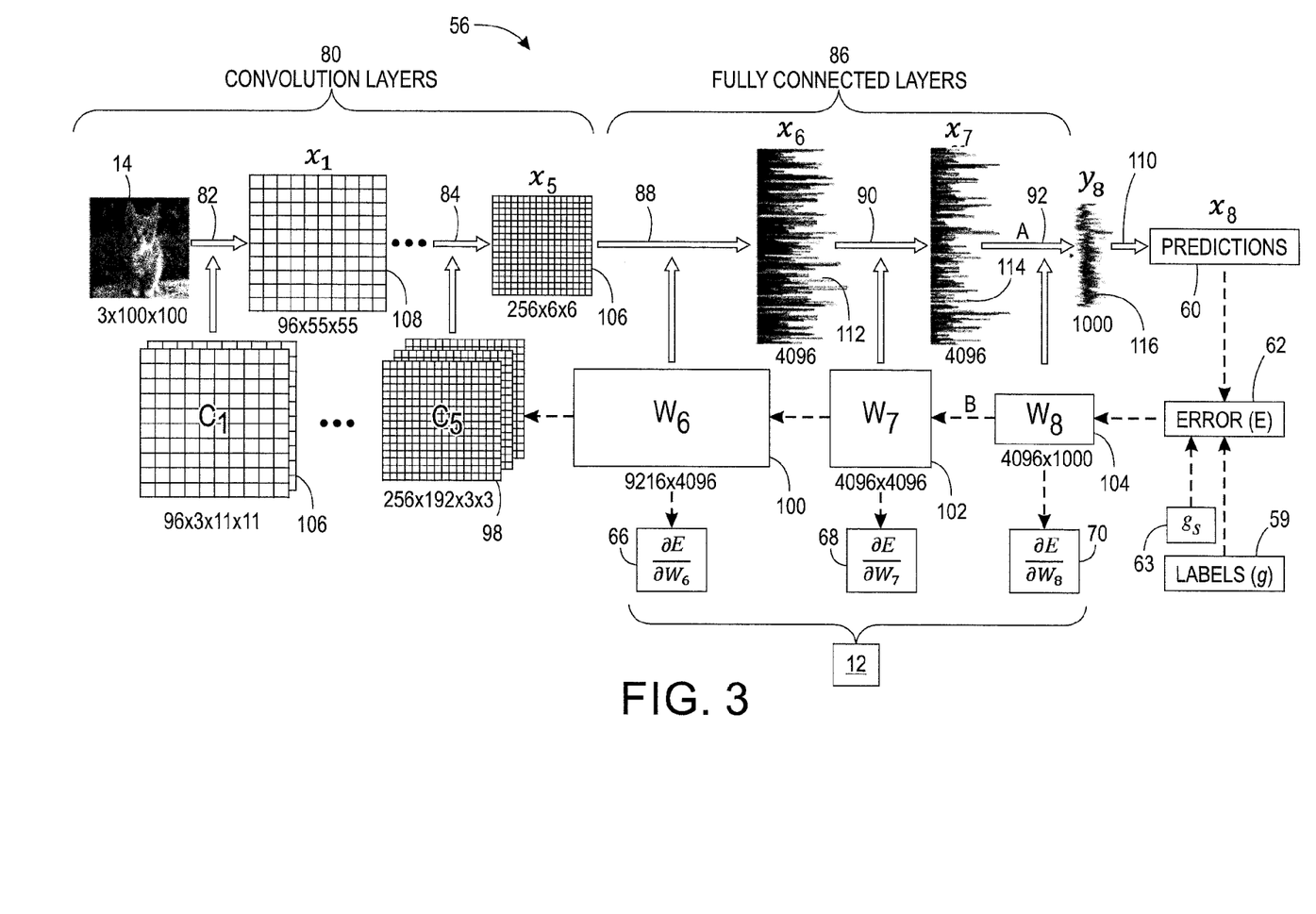
FIG. 3 illustrates an adaptation of a convolutional network to extraction of weight gradients.

FIG. 3 schematically illustrates a neural network 56, e.g., in accordance with the AlexNet architecture of Krizhevsky 2012, which is adapted for use in the present system and method. The neural network 56 receives as input an image 14, which in the case of color images is a 3D tensor-having for each pixel, three colorant values (R, G, and B in the illustrated embodiment). In the case of monochrome (black and white images), the image is a 2D tensor. The supervised layers (operations) of the NN include a sequence 80 of at least one or at least two convolutional layers 82, 84, etc., and a sequence 86 of at least one or at least two fully-connected layers 88, 90, 92. In the case of the NN of Krizhevsky, there are five convolutional layers and three fully-connected layers, although different numbers of these layers may be employed.

Each convolutional layer 82, 84, etc. is parametrized by a tensor 96, 98, etc., having one more dimension than the image, i.e., a 4D tensor in the case of 3D images. Each tensor 96, 98, is a stack of 3D filters. $C_k$, k=1, ..., 5 represent the parameters of the 4D tensors 96, 98, etc. of the illustrated convolutional layers.

Each fully-connected layer 88, 90, 92, etc. is parametrized by a weight matrix 100, 102, 104, etc. denoted $W_k$, where k=6, 7, 8 which are the parameters (matrices) of the fully-connected layers. The stack of fully-connected layers transforms output activation maps 106 of the convolutional layers 82, 84, etc., into class-membership probabilities 60.

During a forward pass of the NN 56 (in direction A indicated by the bold arrows), the filters 96, 98 are run in a sliding window fashion across the output of the previous layer (or the image itself for the first layer 82) in order to produce a 3D tensor 108, 106, etc., which is a stack of per-filter activation maps. These activation maps may then pass through a non-linear transform (such as a Rectified Linear Unit, or ReLU) and an optional pooling stage before being fed to the next convolutional layer. The ReLU may assign a value of 0 to all negative values in the maps. The activation maps 106 generated by the last convolutional layer 84 in the sequence are flattened, i.e., converted to a 1D tensor (a vector), before being input to the first of the fully connected layers. Each fully-connected layer performs a simple matrix vector multiplication followed by a non-linear transform, e.g., ReLU for intermediate layers and a softmax or sigmoid function 110 for the last one. The softmax, sigmoid or similar non-linear function converts a vector of arbitrary real values to a same length vector of real values in the range (0, 1).

At each fully-connected layer of the sequence 86, the input vector 106, 112, 114 is converted to an output vector 112, 114, 116, which may have the same or fewer dimensions (or in some cases, more dimensions). The output 116 of the final fully-connected layer 92 is used to generate the set of predictions 60. Each prediction is a class probability for a respective one of the classes in the set of classes.

Figure 4:
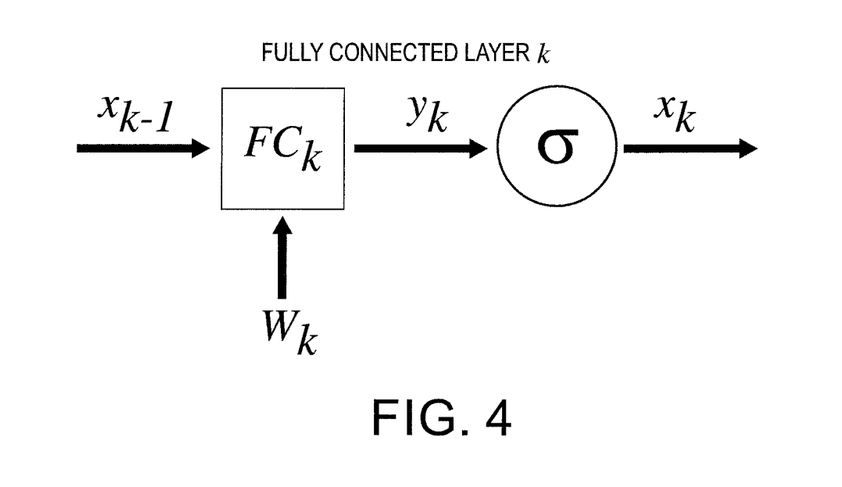
FIG. 4 provides a summary of notations for a fully connected layer k parameterized by a weight matrix $W_k$, with input $x_{k-1}$, output before performing non-linearity $y_k$, and $x_k$ after performing a non-linearity $\sigma$.

The following generalized notations are defined, which are illustrated in FIG. 4. Let $x_k$ be the output of layer k, which is also the input of layer k+1 (for AlexNet, $x_5$ is the flattened activation map of the fifth convolutional layer).

Layer k is parametrized by the 4D tensor $C_k$ if it is a convolutional layer, and by the matrix $W_k$ for a fully-connected layer. A fully-connected layer performs the operation $x_k = \sigma(W_k^T x_{k-1})$, where $\sigma$ is the non-linear function (ReLU for intermediate layers, softmax or similar for the last one). Let $y_k = W_k^T x_{k-1}$ be the output of layer k before the non-linearity, and $\theta = \{C_1, \ldots, C_M\} \cup \{W_{M+1}, \ldots, W_L\}$ the parameters of all L layers of the network 56.

For example, in the NN 56 illustrated in FIG. 3, the image 14 (and similarly each training image) is a 3D tensor (suppose that it includes about 10,000 pixels in each of the 3 colors). In the first convolutional layer, the tensor 96 includes 96 filters for each of 3 colors, each filter being 11×11 pixels, which is used as a sliding window to extract and filter 55×55=3025 overlapping windows from the image. The result of these filters on the input image 14 is a 3D tensor 108 of dimensions 96×55×55 in the illustrative embodiment, i.e., 96 activation maps of size 55×55. As the sequence progresses, the number of "colors" (activation maps) in the output increases and the number of pixels for each color decreases. The output of the last convolutional layer 84 is a 256×6×6 tensor that is easily converted to a 9216 dimensional vector by concatenation. When multiplied by a 9216×4096 matrix 100 of weights, the output is a 4096 dimensional vector 112.

Training the Neural Network (S102)

Training the NN 56 includes end-to-end learning of the vast number of parameters θ 96, 98, 100, 102, 104 via the minimization of an error (or loss) function on a large training set of N images 58 and their ground-truth labels 59 (i.e., pairs ($I^i$, $g^i$)). During training, the set of predictions 60 output by the NN for each training image 58 is compared with its true label 59 (which is typically a vector of zeros except for a 1 corresponding to the index of the true label). This results in an error vector analogous to vector 62, which is back-propagated through each of the weight matrices and 4D tensors in turn to update them.

An exemplary loss function used for classification is the cross-entropy:

$$E(I^i, g^i; \theta) = -\sum_{c=1}^{P} g_c^i \log(x_{L,c}^i) \quad (1)$$

where P is the number of labels (categories), $g^i \in \{0,1\}^P$ is the label vector of image $I^i$, and $x_{L,c}^i$ is the predicted probability of class c for image $I^i$, i.e., the c-th element of the output $x_L^i$ 60 of the last layer L resulting from the forward pass on image $I^i$.

The optimal network parameters θ* are the ones minimizing this loss over the training set 58. This can be expressed as:

$$\theta^* \leftarrow \operatorname*{argmin}_{\theta} \sum_{i=1}^{N} E(I^i, g_i; \theta) \quad (2)$$

This optimization problem can be solved using Stochastic Gradient Descent (SGD), a stochastic approximation of batch gradient descent which entails performing approximate gradient steps equal, on average, to the true gradient $\nabla_\theta E$. See, for example, Krizhevsky 2012. Each approximate gradient step may be performed with a small batch of labeled examples in order to leverage the caching and vectorization mechanisms of the computer system efficiently.

A particularity of deep networks is that the gradients with respect to all parameters θ can be computed efficiently in a stage-wise fashion via sequential application of the chain rule, a technique termed "back-propagation." See, e.g., E. Rumelhart, et al., "Learning representations by back-propagating errors," Nature 323, pp. 533-536, 1986. The training of the network (i.e., obtaining θ*) can be performed via SGD with back-propagation on a large labeled dataset 58, such as ImageNet (J. Deng, et al., "ImageNet: A Large-Scale Hierarchical Image Database," CVPR, 2009). In conventional classification methods, the learned ConvNet parameters are used for labeling using a forward pass on the pre-trained network. In the present application, back-propagation is used again, at test time, to transfer representations that are based on the gradient of the loss with respect to the ConvNet parameters between the fully-connected layers.

Gradient derivation (S110)

ConvNets and other feed-forward architectures are differentiable through all their layers. In the case of ConvNets, the gradients of the loss (error) with respect to the weights of the fully-connected layers 88, 90, 92 can be computed as follows:

$$\frac{\partial E}{\partial W_k} = x_{k-1} \left[ \frac{\partial E}{\partial y_k} \right]^T. \quad (3)$$

using the notations shown in FIG. 4, i.e., the gradient matrix for a given layer k is a function of the output of the prior layer and the error vector of the next layer.

To compute the partial derivatives of the loss with respect to the output parameters used in Equation (3), the chain rule can be applied. In the case of fully-connected layers and ReLu non-linearities, this leads to the following recursive definition:

$$\frac{\partial E}{\partial y_k} = \left[ W_{k+1} \frac{\partial E}{\partial y_{k+1}} \right] \circ \mathbb{1}_{[y_k > 0]} \quad (4)$$

where $\Pi_{[y_k>0]}$ is an indicator vector, set to one at the positions where y>0 and to zero otherwise, and ○ is the Hadamard or element-wise product. The Hadamard product can be rewritten in a compact form as a matrix multiplication, allowing the derivative to be computed as:

$$\frac{\partial E}{\partial y_k} = Y_k \left[ W_{k+1} \frac{\partial E}{\partial y_{k+1}} \right] \quad (5)$$

where $Y_k$ is a square diagonal matrix constructed with the elements of $\Pi_{[y_k>0]}$.

Thus, for example, the gradient features forming the gradient matrix 68

$$\left( \frac{\partial E}{\partial W_7} \right)$$

are computed as a function of the forward features $x_6$ used as input to the layer 90, the error vector 70

$$\frac{\partial E}{\partial y_8}$$

of the next layer 92, weight matrix $W_8$ 104 and the gradient of the error with respect to the output 92, $$\frac{\partial E}{\partial y_8},$$

which can be decomposed recursively:

$$\frac{\partial E}{\partial W_7} = x_6 \left[ Y_7 \left[ W_8 \frac{\partial E}{\partial y_8} \right] \right]^T,$$

The computing of the gradient of the loss function thus entails computing and extracting a set of forward features (e.g., $x_6$) from the neural network, computing and extracting a set of backward features from the neural network, the backward features comprising a gradient of the loss with respect to the output of a selected layer of the neural network computed in a backward pass of the neural network $$\left( e.g., \frac{\partial E}{\partial y_8} \right),$$

and combining the forward and the backward features to construct a set of gradient features, $$\left( e.g., \frac{\partial E}{\partial W_7} \right),$$

the gradient features comprising a gradient of the loss with respect to the parameters $W_8$ of a selected layer of the neural network. For the last layer, the derivation of the gradient with respect to y, i.e., the error 62 is straightforward and gives:

$$\frac{\partial E}{\partial y_L} = g_s - \sigma(y_L) \qquad (6)$$

where $g_s$ is the standardized vector of labels 63 used to compute the loss. In the exemplary embodiment, $g_s$ is an equal-valued vector, $g_s = [1/P, \ldots, 1/P]$, i.e., it is assumed that all classes have equal probabilities. It can be seen that the gradient of the last layer $$\frac{\partial E}{\partial y_L}$$

is simply a shifted version of the output probabilities 60, while the derivatives 70, 68, 66 w.r.t. $y_i$ with $i < L$ are linear transformations of these shifted probabilities.

The gradient features of any one or more of the error matrices 66, 68, 70 can be used to generate representation 12.

Computing Similarities Between Gradients (S114)

The exemplary gradient matrices 66, 68, 70 are very high-dimensional. In the case of the AlexNet architecture, for example, there are about 4 million dimensions for $$\frac{\partial E}{\partial W_8},$$

about 16 million for $$\frac{\partial E}{\partial W_7}$$

and about 32 million for $$\frac{\partial E}{\partial W_6}$$

In this case, computing the gradients explicitly and using the dot-product as a similarity measure between them may not be computationally feasible. As an alternative, the structure of the gradient matrices (rank-1 matrices) can be leveraged by using the trace kernel as a similarity measure. The trace kernel between two matrices A and B is defined as:

$$K_{tr}(A,B) = Tr(A^T B) \qquad (7)$$

It can be shown that, for rank-1 matrices, the trace can be decomposed as the product of two sub-kernels. Let $A = au^T$, $A \in \mathbb{R}^{d \times D}$, and $B = bv^T$, $B \in \mathbb{R}^{d \times D}$, with a, $b \in \mathbb{R}^d$ and u, $v \in \mathbb{R}^D$, then:

$$\begin{aligned} K_{tr}(A, B) &= Tr(au^T (bv^T)^T) \\ &= Tr(au^T v b^T) \\ &= Tr(b^T auv) \\ &= (a^T b) \cdot (u^T v). \end{aligned} \qquad (8)$$

Therefore, for two images A and B, the similarity between gradients can be computed in a low-dimensional space without explicitly computing the gradients with respect to the weights, as follows:

$$K_{tr}\left( \frac{\partial E^{(A)}}{\partial W_k}, \frac{\partial E^{(B)}}{\partial W_k} \right) = \left( (x_{k-1}^{(A)})^T (x_{k-1}^{(B)}) \right) \cdot \left( \left[ \frac{\partial E^{(A)}}{\partial y_k} \right]^T \left[ \frac{\partial E^{(B)}}{\partial y_k} \right] \right). \qquad (9)$$

In Equation (9), the left part of the equation indicates that the forward activations of the two inputs, $x_{k-1}^{(A)}$ and $x_{k-1}^{(B)}$, should be similar. This is a standard measure of similarity which is used between images when described by the outputs of the intermediate layers of ConvNets. However, in the present method, this similarity is multiplicatively weighted by the similarity between the respective backpropagations $$\left[ \frac{\partial E^{(A)}}{\partial y_k} \right] \text{ and } \left[ \frac{\partial E^{(B)}}{\partial y_k} \right].$$

This indicates that, to obtain a high similarity value with the exemplary kernels, not only the target forward activations need to be similar, but also the backpropagation quantities need to be similar, i.e., the forward activations need to have been generated in a similar manner. Two inputs that produce a high score on one activation layer but have been generated using different activations will not yield a large similarity score.

It has also been found that $l_2$-normalizing the activation features (i.e., using a cosine similarity instead of the dot-product) consistently leads to superior results. This is consistent with using a normalized trace kernel, since $\|au^T\|_F = \|a\|_2 \|u\|_2$. In that case, similarity may be computed as:

$$K_{tr}\left( \frac{\frac{\partial E^{(A)}}{\partial W_k}}{\left\| \frac{\partial E^{(A)}}{\partial W_k} \right\|_F}, \frac{\frac{\partial E^{(B)}}{\partial W_k}}{\left\| \frac{\partial E^{(B)}}{\partial W_k} \right\|_F} \right) = \frac{(x_{k-1}^{(A)})^T (x_{k-1}^{(B)})}{\|x_{k-1}^{(A)}\|_2 \|x_{k-1}^{(B)}\|_2} \cdot \frac{\left[ \frac{\partial E^{(A)}}{\partial y_k} \right]^T \left[ \frac{\partial E^{(B)}}{\partial y_k} \right]}{\left\| \frac{\partial E^{(A)}}{\partial y_k} \right\|_2 \left\| \frac{\partial E^{(B)}}{\partial y_k} \right\|_2}, \qquad (10)$$

where the $l_2$ normalization of the individual activations is made explicit in the formulation.

Classification Using the Gradient Features (S114)

The exemplary representations 12, generated as described above, can additionally or alternatively be used for classifying images using the classifier 48. In particular, a classifier model is trained on the image representations 12 of labeled training samples (such as images 58) and their respective ground truth labels 59. Any suitable classifier learning may be employed, such as support vector machines, for learning a linear classifier. A binary classifier model can be learned for each class or a multi-class classifier learned for all classes. Once the classifier model has been learned, it can be used to assign a class to an input image, such as image 14, based on the representation 12.

Comparison of Gradient Features and Fisher Kernels

There are some similarities between the Fisher Kernel (FK) and the present methods using weight-gradient-based representations from ConvNets.

The Fisher Kernel is a generic principle introduced to combine the benefits of generative and discriminative models to pattern recognition. Let X be a sample (image in this case), and let $u_\theta$ be a probability density function that models the generative process of X, where θ denotes the vector of parameters of $u_\theta$. In statistics, the score function is given by the gradient of the log-likelihood of the data on the model:

$$G_\theta^X = \nabla_\theta \log u_\theta(X). \qquad (11)$$

This gradient describes the contribution of the individual parameters to the generative process. Jaakkola 1998 proposed to measure the similarity between two samples X and Y using the Fisher Kernel (FK) which is defined as:

$$K_{FK}(X,Y) = G_\theta^X F_\theta^{-1} G_\theta^Y \qquad (12)$$

where $F_\theta$ is the Fisher Information Matrix (FIM):

$$F_\theta = E_{X:u_\theta}[G_\theta^X G_\theta^{X'}]. \qquad (13)$$

The FIM can be approximated by the identity matrix.

Some extensions make the dependence of the kernel on the classification labels explicit. For example, the likelihood kernel of Fine involves one generative model per class, and entails computing one FK for each generative model (and consequently for each class). See, Fine, et al., "A Hybrid GMM/SVM approach to speaker identification," *ICASSP*, 2001. The likelihood ratio kernel of Smith and Gales is tailored to the two-class problem and involves computing the gradient of the log-likelihood of the ratio between the two class likelihoods. See Smith, et al., "Speech recognition using SVMs. *NIPS,* 2001 (hereinafter "Smith 2001"). Given two classes denoted $c_1$ and $c_2$ with class-conditional probability density functions $p(\bullet|c_1)$ and $p(\bullet|c_2)$ and with collective parameters θ, this yields:

$$\nabla_\theta \log \frac{p(X|c_1)}{p(X|c_2)}. \qquad (14)$$

The exemplary gradient features derived from deep nets show some relationship to the likelihood ratio kernel in Equation (14). As the standard ConvNet classification architecture does not define a generative model, the FK framework cannot be applied as is. It may be noted that Equation (14) can be rewritten as the gradient of the log-likelihood of the ratio between posterior probabilities (assuming equal class priors):

$$\nabla_\theta \log \frac{p(X|c_1)}{p(X|c_2)} = \nabla_\theta \log \frac{p(c_1|X)}{p(c_2|X)} \qquad (15)$$

In the two-class problem of Smith 2001, $p(c_2|X)=1-p(c_1|X)$ and the equation can be rewritten as:

$$\nabla_\theta \log \frac{p(X|c_1)}{p(X|c_2)} \propto \nabla_\theta \log p(c_1|X) \qquad (16)$$

This shows that the likelihood ratio kernel in the two-class case is proportional to the gradient of the log-posterior probability of the class in the numerator. To extend this representation beyond the two-class case, the gradient of the posterior probability of each class is computed, which results in one gradient vector per class. These gradient vectors can be aggregated by concatenating them or averaging the gradient vectors corresponding to the different classes, i.e.:

$$\nabla_\theta \Sigma_{i=1}^P \frac{1}{P} \log p(c_i|X). \qquad (17)$$

This is similar to Equation (1) where the gradient of the (minus) cross-entropy is computed between the output of the network and an uninformative uniform ground-truth label: g=[1/P, . . . , 1/P]. However, the present method generates a representation which can produce superior results, as illustrated in the Examples below.

EXAMPLES

Datasets and Evaluation Protocols

The exemplary method was evaluated on two standard classification benchmarks, Pascal VOC 2007 and Pascal VOC 2012. These datasets contain 9963 and 22,531 annotated images, respectively. Each image is annotated with one or more labels from a set of labels corresponding to 20 object categories. The datasets include well-defined partitions for training, validating, and testing, and the accuracy is measured in terms of the standard mean Average Precision (mAP). The test annotations of VOC 2012 are not public, but an evaluation server with a limited number of submissions per week is available. Therefore, the validation set is used for the first part of the analysis on the VOC2012 dataset, and evaluation is performed on the test set only for the final experiments Two different neural network architectures were evaluated: AlexNet (Krizhevsky 2012) and VGG16 (Simonyan 2014). Publicly available versions of these neural networks that were previously trained on the ILSVRC2012 subset of ImageNet were used (github.com/BVLC/caffe/wiki/Model-Zoo).

To extract descriptors from the Pascal VOC images, they were first resized so that the shortest size had 227 pixels (224 on the VGG16 case), and then a central square crop taken, without distorting the aspect ratio. This cropping technique was found to work well in practice. Data augmentation (either multiple crops or mirroring) was not used for the training and testing images. Feature extraction is performed on a customized version of the Caffe library (http://caffe.berkeleyvision.org), modified to expose the backpropagation features. This allows extracting forward and backward features of the training and testing Pascal images on different layers. As discussed above, a uniform set of labels 63 was invented for the backward pass to extract the gradient features. All forward and backward features are then $l_2$-normalized.

To extract features from the Pascal images, the softmax of the ConvNet was replaced with a tempered version parametrized by temperature τ:

$$\sigma(y, \tau)_d = \frac{\exp(y_d/\tau)}{\Sigma_i \exp(y_i/\tau)}, \quad (18)$$

which reduces to the standard softmax when $\tau$ equals one, and provides softer probability distributions as $\tau$ increases. This was found to produce better results than when using the standard softmax, either as a feature by itself or to construct the gradient features. This is likely due to the saturating nature of softmax and the change of domain (training on ImageNet, testing on Pascal VOC). Slightly increasing the temperature to $\tau=2$ or $\tau=4$ noticeably impacted the results. For all the experiments, $\tau$ was set to 2. As will be appreciated, the tempered softmax is used only to extract the features of the Pascal images used in testing. The ConvNet is trained on ImageNet using the standard softmax.

To perform the classification, the SVM implementation provided in scikit-learn (scikit-learn.org) was used. A custom trace kernel is used for the similarity between gradient representations, as described above. The Gram matrix was explicitly constructed and the SVM objective function (which uses the Gram matrix) is optimized in its dual form in all cases (not just in the trace kernel case) to avoid discrepancies between different solvers. The cost parameter C of the solver was set to the default value of 1, which worked well in practice.

Several features for each dataset and network architecture were extracted and compared:

1. Individual forward activation features, for Pool5 (the output 106 of the last convolutional layer), each of the fully-connected (FC) layers 88, 90, 92, and the final probabilities 60.

2. Concatenation of forward activation features, such as Pool5+FC6, FC6+FC7, or FC7+FC8.

3. Gradient features:

$$\frac{\partial E}{\partial W_6}, \frac{\partial E}{\partial W_7}, \text{ and } \frac{\partial E}{\partial W_8}.$$

The similarity between the $l_2$-normalized forward activation features is measured with the dot-product, while the similarity between gradient representations is measured using the trace kernel. Table 1 summarizes the results. The results on VOC 2012 are on the validation set. Tables 2 and 3 show per-class accuracies for two of the features.

TABLE 1

Results on Pascal VOC 2007 and VOC 2012 with AlexNet and VGG16 features

| Features | VOC2007 AlexNet | VOC2007 VGG16 | VOC2012 AlexNet | VOC2012 VGG16 |
|---|---|---|---|---|
| $x_5$ (Pool5) | 71.0 | 86.7 | 66.1 | 81.4 |
| $x_6$ (FC6) | 77.1 | 89.3 | 72.6 | 84.4 |
| $x_7$ (FC7) | 79.4 | 89.4 | 74.9 | 84.6 |
| $y_8$ (FC8) | 79.1 | 88.3 | 74.3 | 84.1 |
| $x_8$ (Predictions) | 76.2 | 86.0 | 71.9 | 81.3 |
| $x_5$; $x_6$ | 76.4 | 89.2 | 71.6 | 84.0 |
| $\frac{\partial E}{\partial W_6} = x_5 \left[\frac{\partial E}{\partial y_6}\right]^T$ | 80.2 | 89.3 | 75.1 | 84.6 |
| $x_6$; $x_7$ | 79.1 | 89.5 | 74.3 | 84.6 |
| $\frac{\partial E}{\partial W_7} = x_6 \left[\frac{\partial E}{\partial y_7}\right]^T$ | 80.9 | 90.0 | 76.3 | 85.2 |
| $x_7$; $x_8$ | 79.7 | 89.2 | 75.3 | 84.6 |
| $\frac{\partial E}{\partial W_8} = x_7 \left[\frac{\partial E}{\partial y_8}\right]^T$ | 79.7 | 88.2 | 75.0 | 83.4 |

TABLE 2

Pascal VOC2007 with AlexNet and VGG16

| Features | AlexNet $x_7$ (FC7) | AlexNet $\frac{\partial E}{\partial W_7}$ | VGG16 $x_7$ (FC7) | VGG16 $\frac{\partial E}{\partial W_7}$ |
|---|---|---|---|---|
| mean | 79.4 | 80.9 | 89.3 | 90.0 |
| aeroplane | 95.4 | 96.6 | 99.2 | 99.6 |
| bicycle | 88.6 | 89.2 | 95.9 | 97.2 |
| bird | 92.6 | 93.8 | 99.1 | 98.8 |
| boat | 87.3 | 89.5 | 96.9 | 97.0 |
| bottle | 42.1 | 44.9 | 63.8 | 63.3 |
| bus | 80.1 | 81.0 | 92.8 | 93.8 |
| car | 90.5 | 91.9 | 95.1 | 95.6 |
| cat | 89.6 | 89.9 | 98.1 | 98.4 |
| chair | 59.9 | 61.2 | 70.4 | 71.1 |
| cow | 68.2 | 70.4 | 87.8 | 89.4 |
| dining table | 74.1 | 78.5 | 84.3 | 85.3 |
| dog | 85.3 | 86.2 | 97.0 | 97.7 |
| horse | 89.8 | 91.4 | 97.2 | 97.7 |
| motorbike | 85.6 | 87.4 | 93.5 | 95.6 |
| person | 95.3 | 95.7 | 97.3 | 97.5 |
| potted plant | 58.1 | 60.5 | 68.6 | 70.3 |
| sheep | 78.9 | 78.8 | 92.2 | 92.7 |
| sofa | 57.9 | 62.5 | 73.3 | 76.2 |
| train | 94.7 | 95.2 | 98.7 | 98.8 |
| tv monitor | 74.4 | 73.5 | 85.5 | 84.2 |

TABLE 3

Pascal VOC2012 with AlexNet and VGG16

| Features | AlexNet (evaluated on validation set) $x_7$ (FC7) | AlexNet (evaluated on validation set) $\frac{\partial E}{\partial W_7}$ | AlexNet (evaluated on test set) $x_7$ (FC7) | AlexNet (evaluated on test set) $\frac{\partial E}{\partial W_7}$ | VGG16 (evaluated on validation set) $x_7$ (FC7) | VGG16 (evaluated on validation set) $\frac{\partial E}{\partial W_7}$ | VGG16 (evaluated on test set) $x_7$ (FC7) | VGG16 (evaluated on test set) $\frac{\partial E}{\partial W_7}$ |
|---|---|---|---|---|---|---|---|---|
| mean | 74.9 | 76.3 | 75.0 | 76.5 | 84.6 | 85.2 | 85.0 | 85.3 |
| aeroplane | 92.9 | 94.3 | 93.8 | 95.0 | 98.2 | 98.6 | 97.8 | 98.0 |
| bicycle | 75.4 | 77.4 | 75.0 | 76.6 | 88.3 | 89.4 | 85.2 | 86.0 |
| bird | 88.7 | 89.5 | 86.4 | 87.7 | 94.6 | 94.7 | 92.3 | 91.7 |
| boat | 81.7 | 82.2 | 82.2 | 82.9 | 90.5 | 91.5 | 91.1 | 91.3 |
| bottle | 48.0 | 50.8 | 48.2 | 52.5 | 66.0 | 67.2 | 64.5 | 65.7 |
| bus | 89.0 | 90.2 | 82.5 | 83.4 | 93.6 | 94.0 | 89.7 | 89.6 |
| car | 70.3 | 72.4 | 73.8 | 75.6 | 80.5 | 80.9 | 82.2 | 82.4 |
| cat | 88.0 | 89.3 | 87.6 | 88.6 | 96.4 | 96.8 | 95.4 | 95.5 |
| chair | 62.3 | 64.8 | 63.8 | 65.3 | 73.9 | 73.7 | 74.1 | 74.5 |
| cow | 63.6 | 63.9 | 63.5 | 65.4 | 81.3 | 83.7 | 84.7 | 84.2 |
| dining table | 57.8 | 60.3 | 69.3 | 69.8 | 70.2 | 71.9 | 81.1 | 80.7 |

TABLE 3-continued

Pascal VOC2012 with AlexNet and VGG16

| Features | AlexNet (evaluated on validation set) | | AlexNet (evaluated on test set) | | VGG16 (evaluated on validation set) | | VGG16 (evaluated on test set) | |
|---|---|---|---|---|---|---|---|---|
| | $x_7$ (FC7) | $\frac{\partial E}{\partial W_7}$ | $x_7$ (FC7) | $\frac{\partial E}{\partial W_7}$ | $x_7$ (FC7) | $\frac{\partial E}{\partial W_7}$ | $x_7$ (FC7) | $\frac{\partial E}{\partial W_7}$ |
| dog | 83.5 | 84.0 | 85.7 | 86.5 | 93.0 | 93.4 | 94.1 | 94.3 |
| horse | 78.0 | 79.6 | 80.3 | 82.1 | 91.3 | 91.6 | 93.5 | 93.7 |
| motorbike | 82.9 | 84.0 | 84.1 | 85.1 | 91.3 | 91.5 | 91.9 | 92.2 |
| person | 92.9 | 93.2 | 92.3 | 93.0 | 95.1 | 95.4 | 95.0 | 95.4 |
| potted plant | 49.1 | 50.6 | 47.4 | 48.2 | 56.3 | 56.0 | 57.9 | 57.7 |
| sheep | 74.8 | 76.7 | 72.2 | 74.5 | 87.7 | 88.3 | 86.0 | 87.2 |
| sofa | 50.5 | 52.6 | 51.8 | 57.0 | 64.2 | 65.2 | 67.8 | 69.2 |
| train | 90.2 | 91.8 | 88.1 | 88.4 | 95.8 | 95.5 | 95.2 | 95.2 |
| tv monitor | 78.7 | 79.2 | 72.5 | 73.0 | 84.5 | 85.2 | 81.5 | 81.4 |

The results indicate the following:

Forward Activations: In all cases, FC7 is the best performing individual layer on both VOC2007 and VOC2012, independently of the network. The probability layer performs badly in this case. Concatenating forward layers does not seem to bring any noticeable accuracy improvements in any setup.

Gradient Representations: The gradient representations are compared with the concatenation of forward activations, since they are related and share part of the features. On the deeper layers (6 and 7), the gradient representations outperform the individual features as well as the concatenation, both for AlexNet and VGG16, on both datasets. For AlexNet, the improvements are quite significant: +3.8% and +3.5% absolute improvement for the gradients with respect to $W_6$ on VOC2007 and VOC2012, and +1.8% and +2% for $W_7$. The improvements for VGG16 are more modest but still noticeable: +0.1% and +0.6% for the gradients with respect to $W_6$ and +0.5% and +0.6% for the gradients with respect to $W_7$. Larger relative improvements on less discriminative networks such as AlexNet seem to suggest that the more complex gradient representation can, to some extent, compensate for the lack of discriminative power of the network, but that diminishing returns are obtained as the power of the network increases.

For the last of the layers 92 (layer 8) the gradient representations do not perform as well. This is not surprising since the derivative with respect to $W_8$ depends heavily on the output of the probability layer (see Equation (6)), which is susceptible to saturation, hence the results. However, for the derivatives with respect to $W_6$ and $W_7$, more information is involved, leading to superior results.

Per-Class Results: For the per-class results in Tables 2 and 3, the best forward features (the individual FC7) are compared with the best gradient representation $$\left(\frac{\partial E}{\partial W_7}\right).$$

On both networks and datasets, the results are consistently better for the gradient representations. For AlexNet, the gradient representation is equal to or better in performance than FC7 on 18 out of the 20 classes on VOC2007, and on all classes for VOC2012. For VGG, the gradient representation performs equal to or better on 17 out of the 20 classes both on VOC2007 and VOC2012.

Comparison with Other Representations

The best results are compared with the following types of representation on PASCAL VOC2007 and VOC2012 in Table 4:

TABLE 4

Comparison with other ConvNet results on PASCAL VOC'07 and VOC'12 (mAP in %)

| Method | VOC'07 | VOC'12 |
|---|---|---|
| Gradient - based on AlexNet | 80.9 | 76.5 |
| Gradient - based on VGG16 | 90.0 | 85.2 |
| DeCAF (Donahue 2014, from Chatfield 2014) | 73.4 | — |
| Razavian (Razavian 2014) | 77.2 | — |
| Oquab (Oquab 2014) | 77.7 | 78.7 |
| Zeiler (Zeiler 2014) | — | 79.0 |
| Chatfield (Chatfield 2014) | 82.4 | 83.2 |
| He * | 80.1 | — |
| Wei ** | 81.5 | 81.7 |
| Simonyan (Simonyan 2014) | 89.7 | 89.3 |

* He, et al., "Spatial Pyramid Pooling in Deep Convolutional Networks for Visual Recognition," ECCV, 2014.
** Wei, et al., "CNN: Single-label to Multi-label," arXiv, 2014.

It can be seen that competitive performance is obtained on both datasets. The results with VGG16 are somewhat inferior to those reported in Simonyan 2014 with a similar model. This may be due to the more costly feature extraction strategy employed by Simonyan, which involves aggregating image descriptors at multiple scales.

In further experiments, improved results were obtained with the present method by adjusting the parameters of the ConvNet.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for extracting a representation from an image, comprising:
   inputting an image to a pre-trained neural network comprising a sequence of layers;
   computing a gradient of a loss function with respect to parameters of the neural network for the image comprising:
      in a forward pass of the pre-trained neural network:
         extracting a set of forward features input to a selected one of the layers of the neural network which is not a final layer of the neural network, and
         generating a vector of label predictions for the input image from an output of the final layer,
      computing an error vector based on differences between the vector of label predictions and a standardized prediction vector,
      in a backward pass of the neural network, computing a set of backward features from the neural network, the backward features comprising a gradient of a loss function with respect to the output of the selected layer of the neural network, and combining the forward and the backward features through a tensor product operation to compute a set of gradient features for the image;

extracting a vectorial gradient representation of the image comprising the computed set of gradient features;

outputting the vectorial gradient representation or information based on the vectorial gradient representation, the output information including one of:
  a class for the input image output by a classifier trained using gradient representations of training images,
  a computed similarity between the input image and another image based on respective gradient representations of the input image and the other image, and
  a set of similar images retrieved based on similarity of their gradient representations, wherein at least one of the computing and the extracting is performed with a processor including hardware.

2. The method of claim 1, wherein the forward and backward features are combined by matrix multiplication.

3. The method of claim 1, wherein in a forward pass of the neural network, a prediction vector of values is output for the image which includes a prediction value for each of a set of classes, the computing the gradient of a loss function comprising computing a vector of error values based on a difference between the prediction vector and a standard vector comprising a standard value for each of the classes, and backpropagating the error values through at least one of the layers of the neural network.

4. The method of claim 1, wherein the parameters of the neural network comprise parameters of at least one of the fully connected layers of the neural network.

5. The method of claim 1, wherein the output information comprises the computed similarity between the input image and another image based on the respective gradient representations of the image and the other image.

6. The method of claim 1, wherein the gradient representation is classified with a classifier trained on gradient representations of labeled images and the information is based on the classifier classification.

7. The method of claim 1 wherein the neural network is a convolutional network.

8. The method of claim 1, wherein the gradient of the loss function is computed with respect to the weights of at least one of the fully-connected layers according to:

$$\frac{\partial E}{\partial W_k} = x_{k-1} \left[ \frac{\partial E}{\partial y_k} \right]^T,$$

where $x_{k-1}$ represents a respective forward feature input to the selected layer k of the neural network, and $$\frac{\partial E}{\partial y_k}$$

is the partial derivative of the loss E with respect to the output parameters $y_k$ of the layer k.

9. The method of claim 1, wherein the neural network has been pre-trained to predict labels for an image, the training having been performed with a set of labeled training images.

10. A computer program product comprising a non-transitory recording medium storing instructions, which when executed on a computer, causes the computer to perform the method of claim 1.

11. A system comprising memory which stores instructions for performing the method of claim 1 and a processor in communication with the memory for executing the instructions.

12. The method of claim 1, wherein the standardized vector is an equal-valued vector.

13. A method for computing a similarity between two images, comprising:
  with a processor including hardware, for each of two images:
    inputting the image to a pre-trained neural network,
    computing a forward representation in a forward pass of the neural network, and
    computing a backward representation comprising computing a gradient of a loss function with respect to output parameters of a layer of the neural network in a backward pass of the neural network;
  computing a forward similarity between the forward representations of the two images extracted in the forward pass of the neural network;
  computing a backward similarity between the backward representations of the two images extracted in the backward pass of a pre-trained neural network;
  computing the similarity between two images by combining the forward and backward similarities; and
  outputting the computed similarity.

14. The method of claim 13, wherein the combining of the forward and backward similarities is performed by multiplication.

15. The method of claim 13, further comprising retrieving a set of similar images based on the computed similarity between the input image and each of a collection of images.

16. The method of claim 13, wherein the similarity between the first and second images is computed according to:

$$K_{tr}\left(\frac{\partial E}{\partial W_k}^{(A)}, \frac{\partial E}{\partial W_k}^{(B)}\right) = \left((x_{k-1}^{(A)})^T (x_{k-1}^{(B)})\right) \cdot \left(\left[\frac{\partial E}{\partial y_k}^{(A)}\right]^T \left[\frac{\partial E}{\partial y_k}^{(B)}\right]\right),$$

or a normalized function thereof, where $x_{k-1}^{(A)}$ and $x_{k-1}^{(B)}$ represent the respective forward representations for the two images and each comprise forward features input to a selected layer k of the neural network for the respective image, and $$\frac{\partial E}{\partial y_k}^{(A)} \text{ and } \frac{\partial E}{\partial y_k}^{(B)}$$

represent the respective backward representations for the two images and are each the partial derivative of the loss E with respect to the output parameters $y_k$ of the layer k of the neural network for the respective image.

17. A system for extracting a representation from an image, comprising:
  memory which stores a pre-trained neural network;
  a prediction component for predicting labels for an input image using a forward pass of the neural network, and
  a gradient computation component for computing the gradient of a loss function with respect to parameters of the neural network for the image based on the predicted labels on a backward pass of the neural network according to the expression:

$$\frac{\partial E}{\partial W_k} = x_{k-1}\left[Y_k\left[W_{k+1}\frac{\partial E}{\partial y_{k+1}}\right]\right]^T,$$

where $Y_k$ is a square diagonal matrix constructed with the elements of $\Pi_{[y_k>0]}$, $X_{k-1}$ represents a respective forward feature input to a selected layer k of the neural network which is not the last layer, and $$\frac{\partial E}{\partial y_{k+1}}$$

is the partial derivative of the loss E with respect to the output parameters $y_k$ of the layer k +1 of the neural network, and $W_{k+1}$ are parameters of the layer k +1 of the neural network;

a gradient representation generator for extracting a gradient representation of the image based on the computed gradient, the gradient representation being a vector including the computed gradient of the loss function with respect to the parameters of the neural network $$\frac{\partial E}{\partial W_k};$$

an output component which outputs the gradient representation or information based thereon; and a processor in communication with the memory for implementing the prediction component, gradient computation component, gradient representation generator and output component.

18. The system of claim 17 further comprising at least one of:

a classifier, implemented by the processor, for classifying the input image based on its gradient representation, and a similarity component, implemented by the processor, for computing a similarity between the input image and another image based on respective gradient representations of the image and the other image.

* * * * *